12) United States Patent
Shivadas et al.

(10) Patent No.: US 9,936,267 B2
(45) Date of Patent: Apr. 3, 2018

(54) SYSTEM AND METHOD FOR DECREASING AN INITIAL BUFFERING PERIOD OF AN ADAPTIVE STREAMING SYSTEM

(71) Applicant: DivX CF Holdings LLC, New York, NY (US)

(72) Inventors: Abhishek Shivadas, San Diego, CA (US); Kourosh Soroushian, San Diego, CA (US)

(73) Assignee: DivX CF Holdings LLC, New York, NY (US)

( * ) Notice: Subject to any disclaimer, the term of this patent is extended or adjusted under 35 U.S.C. 154(b) by 253 days.

(21) Appl. No.: 13/631,017

(22) Filed: Sep. 28, 2012

(65) Prior Publication Data

US 2014/0068096 A1 Mar. 6, 2014

Related U.S. Application Data

(60) Provisional application No. 61/696,095, filed on Aug. 31, 2012.

(51) Int. Cl.
*H04N 21/2343* (2011.01)
*H04N 21/845* (2011.01)
(Continued)

(52) U.S. Cl.
CPC ... *H04N 21/8456* (2013.01); *H04N 21/23439* (2013.01); *H04N 21/44209* (2013.01); *H04L 65/4084* (2013.01); *H04N 21/6581* (2013.01)

(58) Field of Classification Search
CPC ............. H04L 65/4084; H04L 65/4092; H04L 65/602; H04L 65/80
(Continued)

(56) References Cited

U.S. PATENT DOCUMENTS 6,385,673 B1  5/2002 Demoney
8,812,662 B2  8/2014 Soroushian et al.
(Continued)

FOREIGN PATENT DOCUMENTS

WO  2013002828 A2  1/2013
WO  2013002834 A1  1/2013
WO  2013002835 A1  1/2013

OTHER PUBLICATIONS

"MPEG-2 Part 1, ISO/IEC Standard 13818-1", Generic Coding of Moving Pictures and Associated Audio: Systems, Nov. 13, 1994, 161 pgs.
(Continued)

*Primary Examiner* — Barbara B Anyan
(74) *Attorney, Agent, or Firm* — KPPB LLP

(57) ABSTRACT

System and methods for selecting one of the alternative streams of encoded media from a group of alternative streams of encoded media for use during start-up of playback of the encoded media in accordance with embodiments of this invention are disclosed. The systems and methods begin by determining an estimated stability period for a current bandwidth of a communicative connection between the playback device and a remote system providing the alternative streams of encoded. A test process is then performed on the streams of encoded media to select one of streams of encoded media that provides portions of said encoded media such that an underflow condition does not occur during the estimated stability period. The streaming of encoded media is then commenced by requesting the portions of encoded media be transmitted from the remote server using the selected stream.

26 Claims, 7 Drawing Sheets

(51) Int. Cl.
*H04N 21/442* (2011.01)
*H04L 29/06* (2006.01)
*H04N 21/658* (2011.01)

(58) Field of Classification Search
USPC ....... 709/203, 217, 219, 223, 224, 227, 228, 709/231, 232, 233, 234, 238
See application file for complete search history.

(56) References Cited

U.S. PATENT DOCUMENTS

| | | | |
|---|---|---|---|
| 8,832,297 B2* | 9/2014 | Soroushian | H04L 65/4084 709/231 |
| 9,313,249 B2 | 4/2016 | Soroushian et al. | |
| 2006/0002425 A1 | 1/2006 | Mane et al. | |
| 2006/0031564 A1 | 2/2006 | Brassil et al. | |
| 2007/0086485 A1 | 4/2007 | Vega-garcia et al. | |
| 2009/0144425 A1 | 6/2009 | Marr et al. | |
| 2009/0300203 A1 | 12/2009 | Virdi et al. | |
| 2010/0235542 A1 | 9/2010 | Visharam et al. | |
| 2010/0306373 A1 | 12/2010 | Wormley | |
| 2010/0306810 A1 | 12/2010 | Brooks et al. | |
| 2011/0066673 A1 | 3/2011 | Outlaw | |
| 2012/0173751 A1 | 7/2012 | Braness et al. | |
| 2012/0177101 A1* | 7/2012 | van der Schaar | H04N 21/23439 375/240.01 |
| 2012/0179834 A1* | 7/2012 | van der Schaar | H04N 21/23439 709/231 |
| 2012/0324519 A1 | 12/2012 | Laughlin | |
| 2013/0007200 A1 | 1/2013 | van der Schaar et al. | |
| 2013/0007263 A1 | 1/2013 | Soroushian et al. | |
| 2013/0007297 A1 | 1/2013 | Soroushian et al. | |
| 2014/0365651 A1 | 12/2014 | Soroushian et al. | |

OTHER PUBLICATIONS

"MPEG-4, Part 14, ISO/IEC 14496-14", Information technology—Coding of audio-visual objects, Nov. 15, 2003, 18 pgs.
Fielding et al., "Hypertext Transfer Protocol—HTTP1.1", Network Working Group, Jun. 1999, 114 pgs.
Gannes, "The Lowdown on Apple's HTTP Adaptive Bitrate Streaming", GigaOM, Jun. 10, 2009, 12 pgs.
Schulzrinne, H. et al., "Real Time Streaming Protocol 2.0 (RTSP): draft-ietfmmusic-rfc2326bis-27", MMUSIC Working Group of the Internet Engineering Task Force (IETF), Mar. 9, 2011, 296 pages.
Zambelli, Alex, "IIS Smooth Streaming Technical Overview", Microsoft Corporation, Mar. 2009.
International Preliminary Report on Patentability for International Application No. PCT/US2011/064684, dated Mar. 4, 2014, 5 pgs.
International Preliminary Report on Patentability for International Application No. PCT/US2011/068156, Report dated Jan. 7, 2014, 9 Pgs.
International Preliminary Report on Patentability for International Application No. PCT/US2011/068264, Search Completed Jan. 7, 2014, dated Jan. 16, 2014, 5 pgs.
International Search Report and Written Opinion for Application PCT/US2011/068264, Search Completed Mar. 30, 2012, dated May 1, 2012, 6 pgs.
International Search Report and Written Opinion for International Application No. PCT/US2011/068156, Search completed Apr. 7, 2012, dated May 1, 2012, 11 Pgs.
International Search Report and Written Opinion for International Application PCT/US2011/064684, Search Completed Mar. 26, 2012, dated Apr. 10, 2012, 7 pgs.

* cited by examiner

SYSTEM AND METHOD FOR DECREASING AN INITIAL BUFFERING PERIOD OF AN ADAPTIVE STREAMING SYSTEM

CROSS-REFERENCE TO RELATED APPLICATIONS

The current application claims priority to U.S. Provisional Patent Application No. 61/696,095, filed 31 Aug. 2012, titled "System and Method for Decreasing an Initial Buffering Period of an Adaptive Streaming System", the disclosure of which is incorporated herein by reference.

FIELD OF THE INVENTION

This invention generally relates to start-up of playback of an encoded media in an adaptive streaming system. More particularly, this invention relates to systems and methods that can reduce the amount of encoded media buffered by a playback device prior to starting playback of the media.

BACKGROUND OF THE INVENTION

The term streaming media describes the playback of media on a playback device, where the media is stored on a server and continuously sent to the playback device over a network during playback. For purposes of this discussion, media and/or encoded media is defined as data of a work that includes video, audio, pictures, or another type of presentation that may be displayed, played or in some other way presented by a playback device. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources.

Adaptive streaming solutions typically utilize either Hypertext Transfer Protocol (HTTP), published by the Internet Engineering Task Force and the World Wide Web Consortium as RFC 2616, or Real Time Streaming Protocol (RTSP), published by the Internet Engineering Task Force as RFC 2326, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device. RTSP is a network control protocol used to control streaming media servers. Playback devices issue control commands, such as "play" and "pause", to the server streaming the media to control the playback of media files. When RTSP is utilized, the media server records the state of each client device and determines the media to stream based upon the instructions received from the client devices and the client's state.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

When a playback device commences adaptive bitrate streaming, the playback device typically starts by requesting portions of media from the lowest bitrate streams (where alternative streams are available). As the playback device downloads the requested media, the playback device can measure the available bandwidth. In the event that there is additional bandwidth available, the playback device can switch to higher bitrate streams.

To start playback of the encoded media, the playback device often attempts to buffer an adequate amount of the requested encoded media be received and stored to provide a minimum amount of playback time prior to commencing the playback. Buffering encoded media can assure that there are no underflow conditions during playback. An underflow condition is when the playback device does not have the next portion of encoded media needed to continue the playback. However, the acquisition of an adequate amount of encoded media usually causes a delay in the start of playback of the encoded media by the device. This is typically not a problem when the playback is only periodically started and/or re-started.

However, recently devices such as tablets and other mobile playback devices have made it easier for users to search the encoded media and re-start the playback at various points in the playback. As such, the conventional start-up requiring an adequate amount of encoded media may cause unsatisfactory pauses or delays in presentation of the playback. As such, those skilled in the art are constantly striving to provide a playback start-up that requires less of the encoded media prior to commencement of the playback to minimize the time needed for a start and/or re-start of the playback.

SUMMARY OF THE INVENTION

Systems and methods for decreasing an initial buffering period in an adaptive bitrate system in accordance with embodiments of this invention are disclosed. In accordance with some embodiments, a playback device selects one of set of alternative streams for start-up of playback of encoded media from a playback position within the encoded media in the following manner. The playback device begins by determining an estimated stability period for a current bandwidth of a communicative connection between the playback device and a remote system providing the alternative streams in response to a playback request. The playback device then selects one of the alternative streams from which each of the portions of the encoded media starting from the playback position can be provided prior to a playback time for the portion of encoded media during the estimated stability period such that an underflow condition does not occur during playback of the encoded media. The playback device then commences streaming of the encoded media by requesting the portions of encoded media be transmitted using the selected one of the alternative stream from the remote server. In accordance with some of these embodiments, the selected alternative stream also can provide a sufficient number of the portions of the encoded media starting from the playback position prior to an end of the estimated stability period to provide a sufficient buffer during playback after the estimated stability period has ended.

The selection of the alternative stream to use is performed in the following manner in accordance with some embodiments of this invention. The selection process begins by selecting of the alternative streams of encoded media to test. An index of portions of the encoded media for the selected stream is read to determine the size of each of the portions of encoded media starting from the playback position in the selected stream. A download time for each of the portions in the selected stream starting from the playback position is then determined based on the size of each of portions. The download time of each of the portions starting from the playback position is then compared to the playback time of the data in each of the portions and to determine whether an underflow condition occurs during the estimated stability period. If no under flow condition will occur, the download time of each of the portions is compared to an end time of the estimated stability period to determine whether a predetermined number of the portions of the selected stream is received prior to the end of the estimated stability period to provide a sufficient buffer for playback after the estimated stability period has ended. The stream is then selected if the process determines no underflow conditions will occur during the estimated stability period and if a sufficient buffer for playback is provided after the estimated stability period ends. In accordance with some of these embodiments, the selection of the streams and comparisons are repeated until a stream is selected.

In accordance with some embodiments of this invention, an alternative selection process is performed in response to a determination that none of the streams can provide the portions without an underflow condition and/or without a sufficient buffer at the end of the estimated stability period. In accordance with some embodiment of this invention the alternative selection process is performed by discarding a first portion from each of portions from each stream starting from the playback position from consideration and then repeating the selecting of one of the alternative streams, comparing of the download time of each of the portions to the playback time of each of the portions, and comparing of the download time of each of the of portions for each off the streams with the end time of the estimated stability period for the alternative streams with the first portion of each of the first portions discarded. In accordance with other embodiments, the alternative selection process is performed by selecting one of the alternative streams from which to obtain the portions of the encoded media and requiring a predetermined number of the portions starting from the playback position be received prior to commencing playback of the encoded media.

In accordance with some embodiments of this invention, the selection of one the alternative streams to test is based on a maximum bitrate of each of the plurality of alternative streams. In accordance with some embodiments of this invention the selection process further includes determining whether the index of portions for the selected alternative stream is stored by the playback device. If the index is not stored by the playback device, the index of portions for the selected alternative stream is requested from the remote system. The index of portions of the selected alternative stream is then received by the playback device in response to the request.

In accordance with some embodiments of this invention, the estimated stability period is determined by receiving the estimated stability period from the remote system. In accordance with other embodiment of this invention, the estimated stability period is determined by reading a predefined value for the estimated stability period from a memory of the playback device. In accordance with still other embodiments, the estimated stability period is calculated by the playback device from information about the communicative connection stored in memory.

DETAILED DISCLOSURE OF THE INVENTION

Turning now to the drawings, systems and methods for decreasing an initial buffering period in an adaptive bitrate system in accordance with embodiments of the invention are illustrated. Adaptive streaming systems generally require an initial buffering period in order to obtain enough data of the encoded media to avoid underflow conditions in the latter parts of the multimedia presentation. For purposes of this discussion, an underflow condition is when a playback device does not have enough data of the encoded media in a buffer to continue playback of the encoded media. Typically, this buffering period may apply to the initial start of the system, as well as after each trick-play or seek operation. In current playback devices, many stream switching algorithms enforce a rule involving buffering a predetermined duration of video. In many instances, adaptive bitrate streaming systems download portions of video that include closed groups of pictures and can perform stream switches between closed groups of pictures. Examples of rules involving buffering a predetermined duration of video include (but are not limited to) an 8 second rule used in an adaptive bitrate streaming system that downloads closed groups of pictures have 2 second durations. The 8 second rule involves the playback device receives enough data of the encoded media to provide 8 seconds of playback prior to commencing the playback of the encoded media. In accordance with embodiments of this invention, systems and methods are provided that allow only one portion of encoded media (i.e. one closed group of pictures), to be received prior to commencing the playback. This reduces the start-up time from the time needed to receive a specific number of portions of the media to the time needed to receive a single portion of the media to greatly enhance the user's enjoyment of the playback of the encoded media.

Streaming System Architecture

Figure 1:
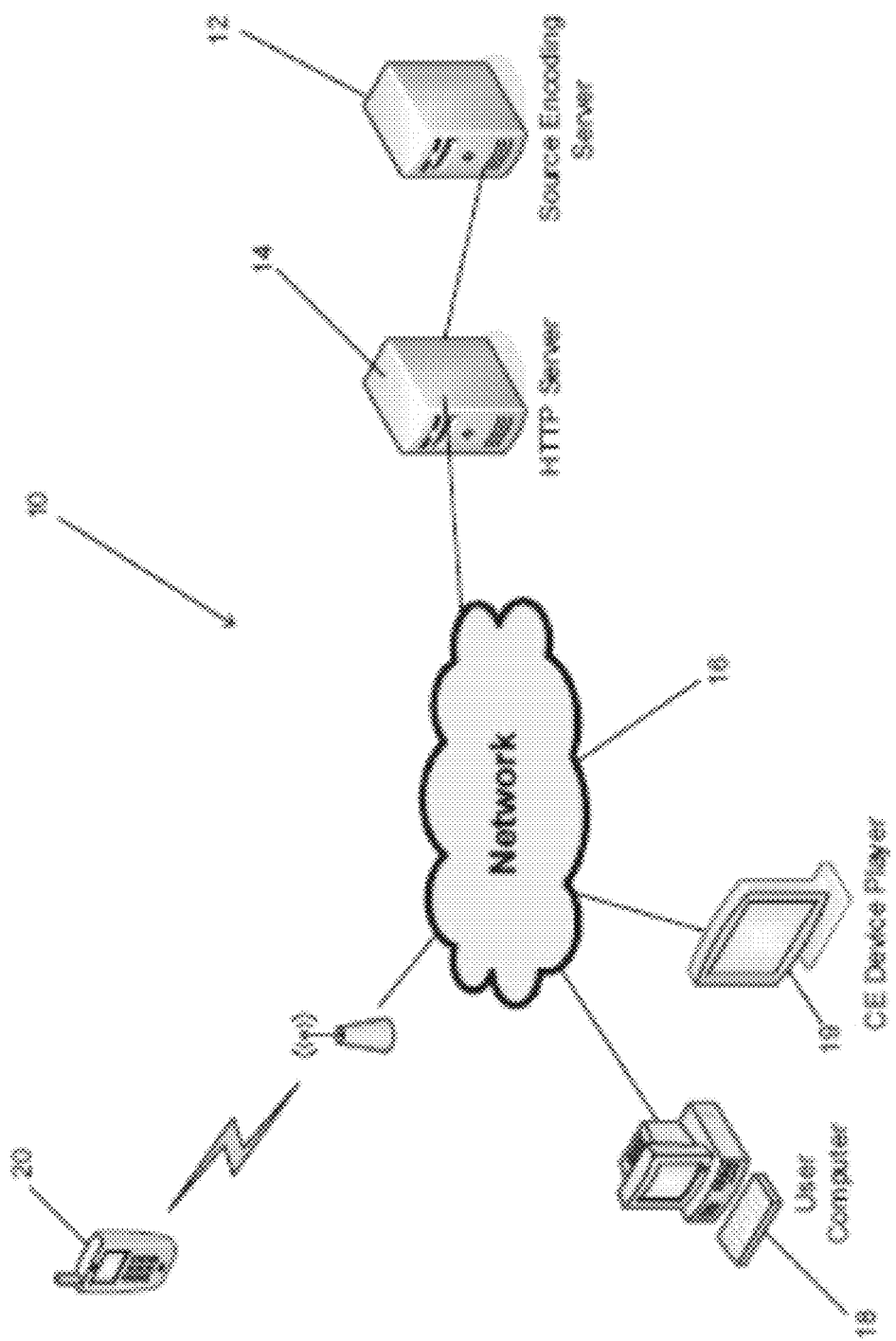
FIG. 1 illustrates a network diagram of a media streaming system in accordance with an embodiment of the invention.

Turning now to the FIG. 1, an adaptive streaming system in accordance with an embodiment of the invention is illustrated. The adaptive streaming system 10 includes a source encoder 12 configured to encode source media as a number of alternative streams. In the illustrated embodiment, the source encoder is a server. In other embodiments, the source encoder can be any processing device including a processor and sufficient resources to perform the transcoding of source media (including but not limited to video, audio, and/or subtitles). Typically, the source encoding server 12 generates a top level index to a plurality of container files containing the streams, at least a plurality of which are alternative streams. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The top level index file and the container files are uploaded to an HTTP server 14. A variety of playback devices can then use HTTP or another appropriate stateless protocol to request portions of the top level index file and the container files via a network 16 such as the Internet.

In the illustrated embodiment, playback devices include personal computers 18, CE players, and mobile phones 20. In other embodiments, playback devices can include consumer electronics devices such as DVD players, Blu-ray players, televisions, set top boxes, video game consoles, tablets, and other devices that are capable of connecting to a server via HTTP and playing back encoded media. Although a specific architecture is shown in FIG. 1, any of a variety of architectures including systems that perform conventional streaming and not adaptive bitrate streaming can be utilized that enable playback devices to request portions of the top level index file and the container files in accordance with embodiments of the invention.

Playback Device

Figure 2:
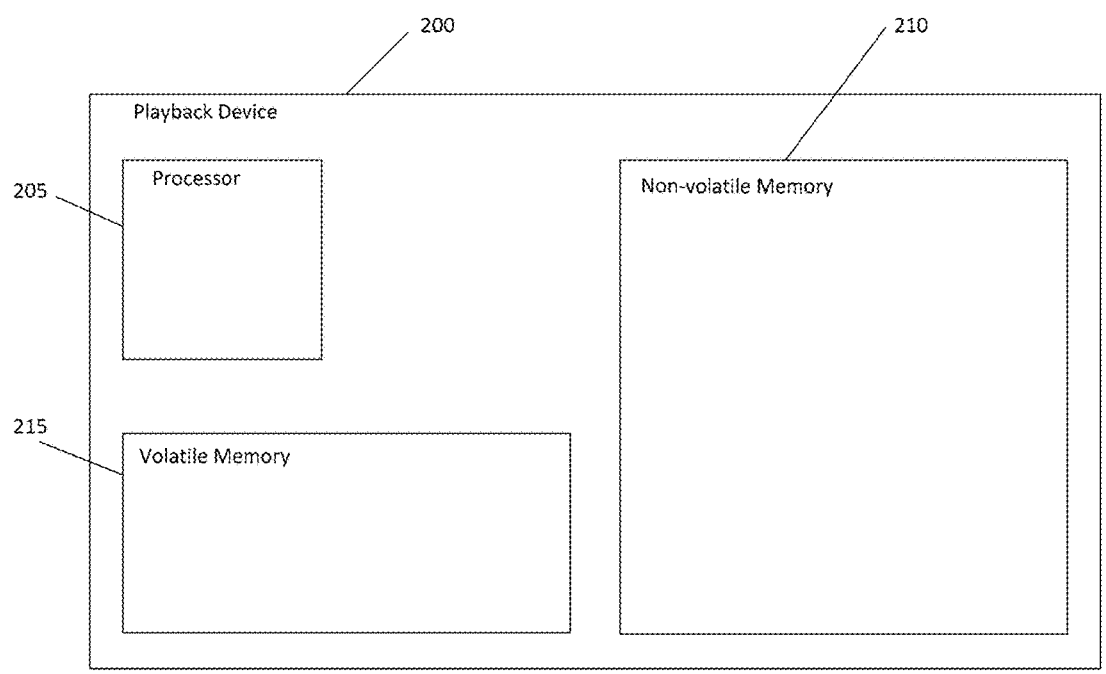
FIG. 2 illustrates a block diagram of a playback device that performs process for providing systems and methods in accordance with an embodiment of this invention.

The processes for providing methods and systems in accordance with this invention are executed by a playback device. The relevant components in a playback device that perform the processes in accordance with an embodiment of the invention are shown in FIG. 2. One skilled in the art will recognize that playback device may include other components that are omitted for brevity without departing from this invention. The playback device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or non-volatile memory 210 to manipulate data stored in the memory. The non-volatile memory 210 can store the processor instructions utilized to configure the playback device 200 to perform processes including processes in accordance with embodiments of the invention and/or data for the processes being utilized. In other embodiments, the playback device software and/or firmware can be stored in any of a variety of computer readable media appropriate to a specific application. Although a specific playback device is illustrated in FIG. 2, any of a variety of playback devices configured to store encrypted cryptographic data and to collect information concerning device characteristics can be utilized in accordance with embodiments of the invention.

Playback Start-Up Process

In accordance with many embodiments of this invention, a process for providing start-up of a playback process with only a minimal amount of data of the encoded media is provided by the playback device. In adaptive streaming systems, such as the system described with reference to FIG. 1, the data for the encoded media is generally downloaded in packets or groups of data that are referred to as portions of encoded media for purposes of this discussion. The portions of encoded media typically represent a certain amount of playback time. The encoded media is typically divided based upon the amount of data need for playback between the time needed to switch streams. The portions of encoded media in the system described with reference to an embodiment of the invention as shown in FIG. 1 represent 2 seconds of playback time in accordance with an embodiment of this invention. However, other embodiments may divide the data based on other amounts of time without departing from this invention. In prior art adaptive streaming systems, the start-up algorithms for playback systems require a certain amount of playback time which, in turn, requires that at least a specified number portions of the encoded data be downloaded prior to the playback being commenced. In accordance with the embodiment shown in FIG. 1, the amount of playback time is 8 seconds and 4 portions, each representing 2 seconds of playback time are needed to provide the required data. One skilled in the art will recognize that other time limits for the playback time and portions may be used depending on the requirements of the system without departing from embodiments of this invention. The requirement of a certain amount of data to provide a certain amount of playback is to prevent underflow conditions from occurring during playback.

Figure 6:
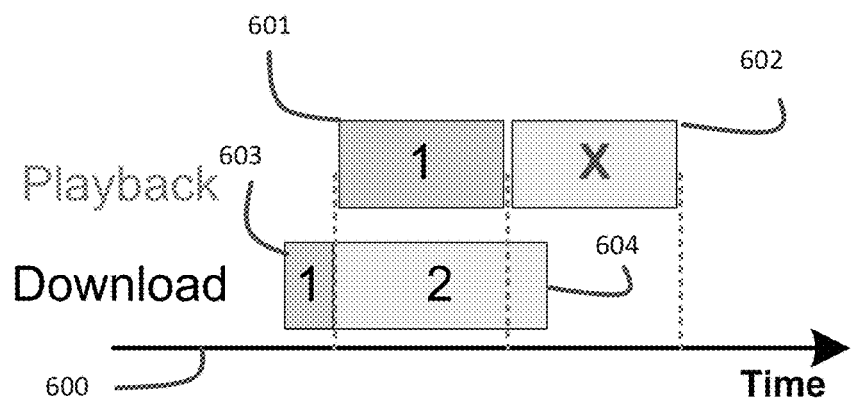
FIG. 6 illustrates a representation of playback time versus stream portion download time to describe an underflow condition in accordance with embodiments of this invention.

An underflow condition is when the playback device does not have enough data of the encoded media stored in a buffer to continue playback. FIG. 6 illustrates an underflow condition during playback. Playback periods 601 and 602 are the first and second playback periods for playing back the encoded media. In the system described with reference to FIG. 1, first and second playback periods 601 and 502 are each two second in length. However, one skilled in the art will recognize that the exact time of each playback period is dependent on the exact type of adaptive streaming system used and the above is for exemplary purposes only. First and second download time periods 603 and 604 are the periods needed to receive first and second portions of the stream of encoded media that provides the data for playback of the encoded media during first and second playback periods 601 and 602. As shown in FIG. 6, the downloading and playback of the encoded media occur along timeline 600. First download time period 603 is completed prior to the first playback period 601. Therefore, all of the data of the encoded media needed during first playback period 601 is received prior to first playback period 601. However, second download time period 604 overlaps with second playback period 602. Thus, the system has an underflow condition because the second portion of encoded data needed for playback during second playback period 602 is not received prior to the beginning of second playback period 602.

Figure 3:
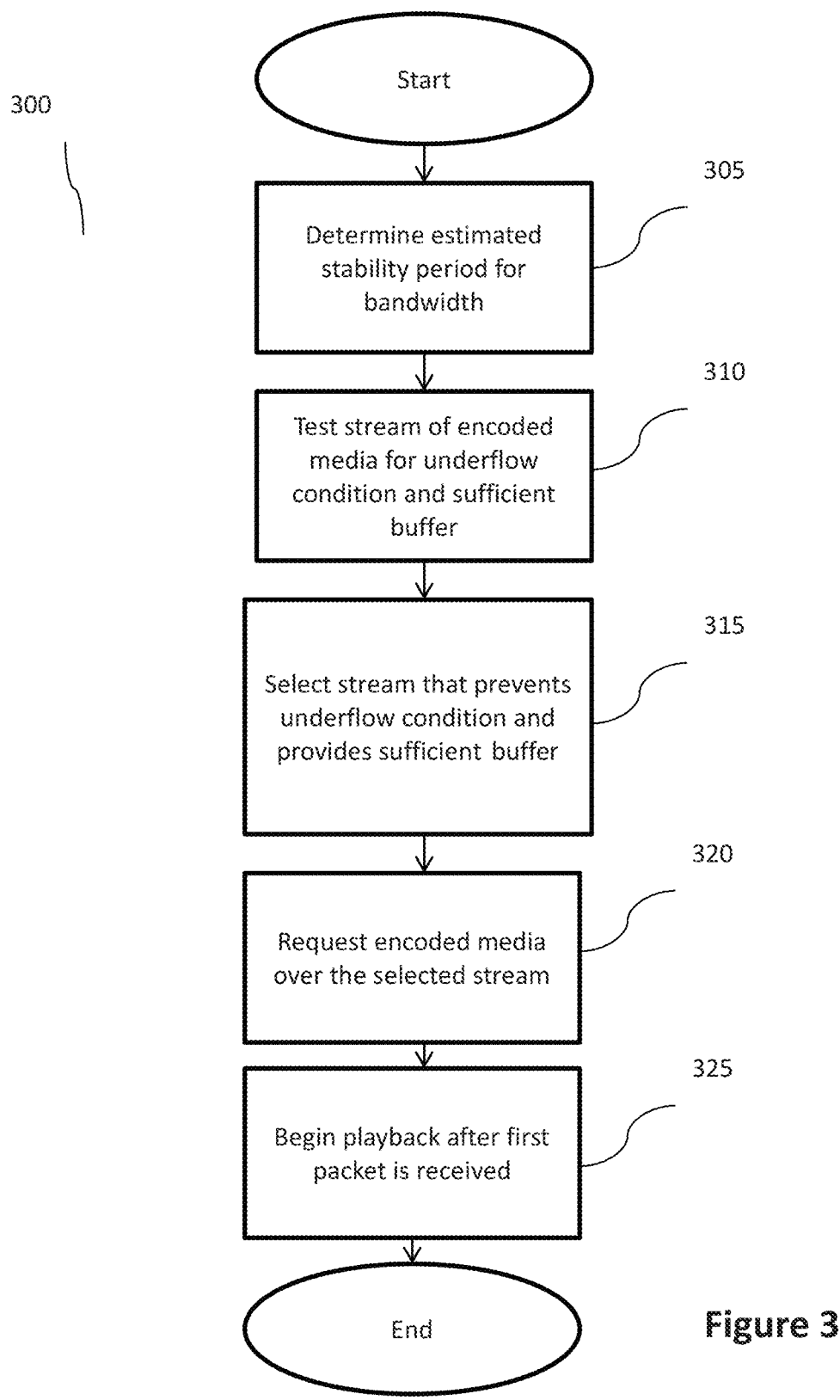
FIG. 3 illustrates a flow diagram of a process performed by a playback device for selecting a stream to reduce the amount of buffering needed for a start-up of playback of the encoded media in accordance with embodiments of this invention.

A process performed by a playback device for selecting a stream of encoded media in an adaptive streaming system such that playback may begin after receiving one portion of the encoded data of the stream in accordance with embodiments of this invention is shown in FIG. 3. Process 300 begins by determining an estimated stability period for the bandwidth of the communicative connection between the playback device and the remote server providing the streams of encoded data in 305. The bandwidth is a known bandwidth measure that is known or calculated by the playback device based upon network and connection conditions. The estimated period of stability is the time period that the bandwidth is expected to remain stable. The estimated period of stability varies based upon the conditions of the network to which the playback device is connected. In accordance with some embodiments of this invention, the estimated stability period may be a defined value stored in a memory of the playback device. In accordance with other embodiments, the estimated stability period may be calculated by the playback device from data gathered by the playback device while monitoring the current bandwidth and previous conditions stored in a persistent memory of the device. In still other embodiments, the estimated stability period may be received from a server that calculates the estimated stability period based on feedback from the playback device or based upon feedback received from a class of devices similar to the playback device.

In 310, the playback device tests the streams of encoded media to determine whether an underflow condition will occur during playback in the estimated stability period if the stream is used. The streams are also tested to determine whether a predetermined number of portions of the encoded media will be received during the estimated stability period to provide a sufficient buffer during playback. The predetermined number is a number of portions that provide data for a specified number of playback time periods after the estimated stability period expires. For example, a system may require enough portions of data to provide for 4 time periods of playback after the end of the estimated stability period or 8 seconds of playback time in accordance with an embodiment of this invention. However, the precise amount of portions and the amount of playback time required needed may vary based upon the configuration of the system and/or playback device.

A stream is selected to use to receive the portions of the encoded media needed for playback at 315. The stream is selected because the test process determined that no underflow conditions will occur during the estimated stability period when portions of the encoded media are received using the stream. Furthermore, the stream may also satisfy a requirement that at least the predetermined number of portions of the encoded media will be received by the end of the estimated stability period to provide a sufficient buffer during playback after the estimated stability period in accordance with some embodiments of this invention. The buffer can allow the playback device to determine an adequate stream to use to receive portions of the encoded media based upon the bandwidth conditions after the estimated stability period to continue playback. After the stream is selected, the playback device transmits a request to the remote server to provide portions of the encoded media using the selected stream in 320. The playback device then begins playback of the encoded media after the first portion of the encoded media is received in 325 and process 300 ends.

Figure 4:
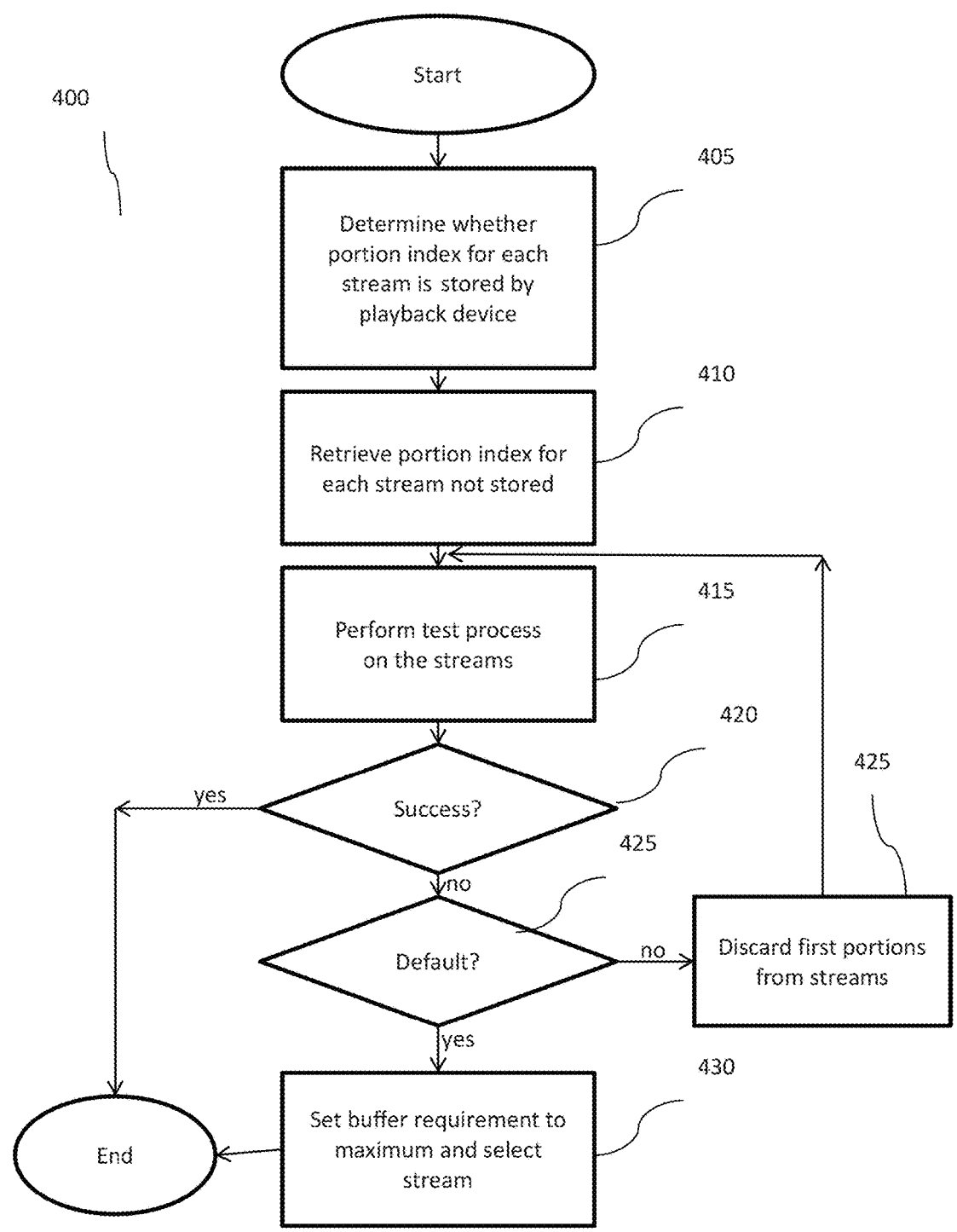
FIG. 4 illustrates a flow diagram of a process for testing the streams of encoded media to select a stream in accordance with embodiments of this invention.

A process performed by the playback device to test the streams of encoded media to select a stream that provides portions of the encoded media starting from the playback position that do not cause an underflow condition during playback in the estimated stability period and provides a predetermined number of portions prior to the end of the estimated stability period to provide a sufficient buffer during playback in accordance with an embodiment of this invention is shown in FIG. 4. Process 400 begins in 405 by determining whether a portion index for each of the streams being tested is stored in a memory of the playback machine. These portion indexes are typically part of the information downloaded by the playback device with the top level index and stream information from the container files and provide the size of each portion of the encoded media in the stream. If the playback device does not have a portion index for one or more of the streams, the playback device requests and receives the portion indexes for the streams that are not stored from the remote server in 410.

In 415, the playback device performs a test process on the streams. An embodiment of the test process is described below with reference to FIG. 5. In 420, process 400 determines whether the test process successfully selected a stream for use during the startup of playback. If a stream has been selected by the test process, process 300 ends. If a stream has not been selected, process 400 may allow a default process for start-up of playback in 425. If the default process is used, a buffer requirement is set to a maximum predetermined number of portions to provide enough data for a certain amount of playback time and a stream of encoded media is selected. In the embodiment described with reference to FIG. 1, the maximum default buffer is set to 4 portions of the encoded media in order to provide 8 seconds of playback. However, any number of portions may be used and any amount of playback time may be required without departing from this invention. The exact number of portions and amount of playback time required for the buffer depend on the adaptive streaming system used.

Alternatively, process 400 may discard the first portion of encoded data from each stream in 425 and repeat the test process from 415 using the stream with the discarded first portion. This allows the process to try to determine a stream that can be used to allow star-up of the playback of the encoded media after two portions of the encoded media are downloaded.

Figure 5:
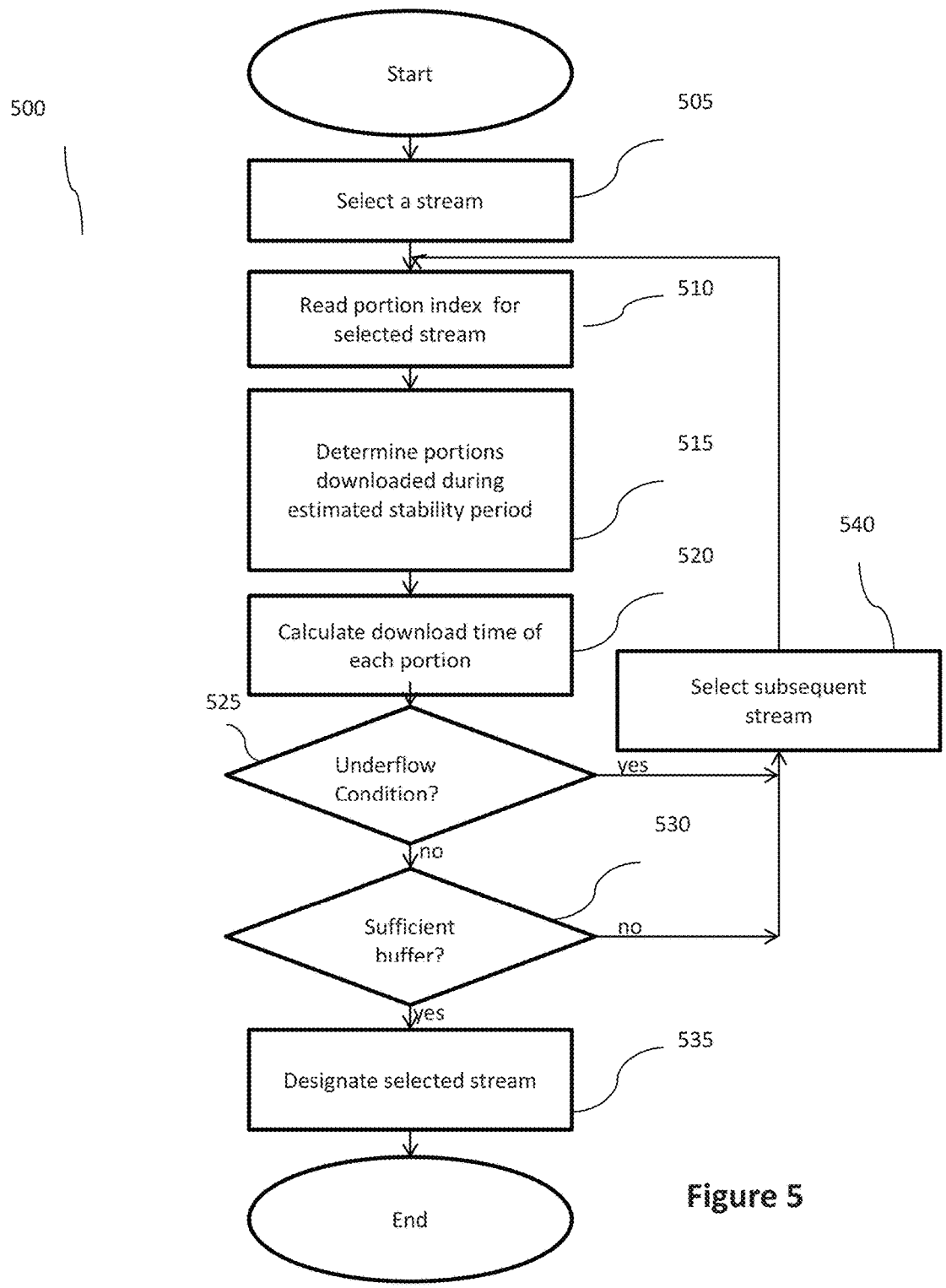
FIG. 5 illustrates flow diagram of a test process performed on the streams to determine whether an underflow condition will occur during an estimated stability period and that a sufficient buffer will be provided at an end of the estimated stability period in accordance with embodiments of this invention.

A process performed by playback device in 415 of process 400 to select a stream in accordance with embodiments of this invention is shown in FIG. 5. Process 500 begins in 505 by selecting a stream. In accordance with some embodiments, the stream may be selected by the maximum bitrate of each stream in either ascending or descending order. However, those skilled in the art will recognize that other properties of the encoded media in the streams, such as resolution and frame rate may also be used for the selection of the stream to test without departing from embodiments of this invention.

After the stream is selected, the portion index for the selected stream is read in 510. Process 400 then determines the portions of the stream starting from the playback position of the encoded media and the size of each portion that may be downloaded during the estimated stability period in 515. The information about the size of the portions is then used to determine the download time of each portion of the selected stream in 520. In 525, the download time of each of the portions starting from the playback position is compared to a playback time for the information to determine whether an underflow condition may occur. If process 500 determines that an underflow condition may occur for the selected stream, a new stream is selected, if available, in 540 and process 500 is repeated from 510 for the subsequent stream. If there are no more streams available, process 500 may return an indication that test process 500 was unsuccessful in selecting a stream.

If process 500 determines that no underflow condition may occur, process 500 determines whether a predetermined number of portions of the stream starting from the playback position of the encoded media may be downloaded prior to the end of the estimated stability period. If it is determined that at least the predetermined number of portions will be downloaded, the stream will provide a sufficient buffer for playback at the end of the estimated stability period and process 500 selects the stream for use in 535. Otherwise, a new stream is selected, if available, in 540 is repeated from 510 for the subsequent stream. If there are no more streams available, process 500 may return an indication that test process 500 was unsuccessful in selecting a stream.

Example of Test Process

Figure 7:
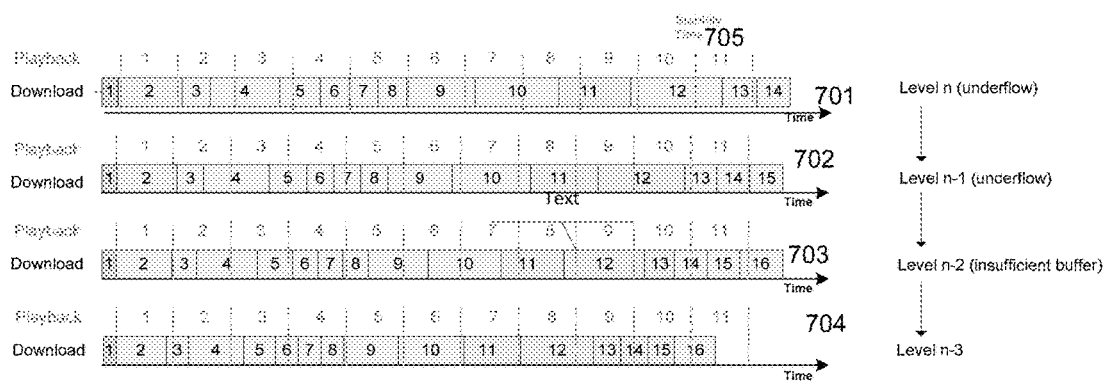
FIG. 7 illustrates the download times for portions of encoded media of various streams versus the estimated stability period and playback time in accordance with an embodiment of this invention.

An illustration of the selection of a stream for use in receiving portions of the encoded media in accordance with an embodiment is provided with respect to FIG. 7. Four streams, 701-704, that may be used by a playback device to receive portions of the encoded media for playback of the encoded media in an embodiment of this invention are shown. The playback device uses the above described process to select one of streams for use in playback. Streams 701-704 are shown in descending order of maximum bitrates and the streams are selected in the test process in accordance with maximum bitrates. In the example, the test process begins be determining the estimated stability period. The end of the estimated stability period is shown as line 705. The test process first reads the index of portions of encoded data of stream 701 and determines the download times of the portions starting from the playback position in the encoded media as shown. The download times are then compared to the playback times of the portions. As can be seen in FIG. 7, the download time of the second portion of stream 701 does not end prior to the beginning of the second playback time. Therefore, the test process moves to the next stream with the next highest maximum bitrate, stream 702.

The test process reads the portion index for stream 702 and determines the playback times for the portions of encoded media starting from the playback position as shown in line 702. The playback times of the portions of stream 702 are compared to the playback times. As can be seen in FIG. 7, the download time of the second portion of stream 702 does not end prior to the beginning of the second playback time. Therefore, the test process moves to the next stream with the next highest maximum bitrate, stream 703. The test process reads the portion index for stream 703 and determines the playback times for the portions of encoded media starting from the playback position as shown in line 703. The playback times of the portions of stream 703 are compared to the playback times. As can be seen from line 703, no underflow conditions may occur as all of the portions will be received prior to the corresponding playback time. Thus, the process determines whether a predetermined number of portions will be received prior to the end of the estimated stability period using stream 703. In this case, the stability period ends after the $10^{th}$ playback period or 20 seconds. Therefore, the stream must be able to provide at least 28 seconds of playback or 14 portions of encoded media prior to the end of the estimated stability period. Stream 703 only provides 13 complete portions prior to the end of the estimated stability period. As such, the test process does not select stream 703 for use and selects the stream with next highest maximum bandwidth, stream 704 for testing. The test process reads the portion index for stream 704 and determines the playback times for the portions of encoded media starting from the playback position as shown in line 704. The playback times of the portions of stream 704 are compared to the playback times. As can be seen from line 704, no underflow conditions may occur as all of the portions will be received prior to the corresponding playback time prior to the end of the estimated stability period. Thus, the test process then determines whether the predetermined number of portions may be downloaded prior to the end of the estimated stability period. As seen in line 704, 15 portions of encoded media may be received prior to the end of the estimated stability period. Thus, the test process selects stream 704 to provide the portions of encoded media for playback as stream 704 will not cause underflow conditions during the estimated period of stability and provides a sufficient buffer at the end of the estimated period of stability.

Improved Playback Start Up Time

Figure 8:
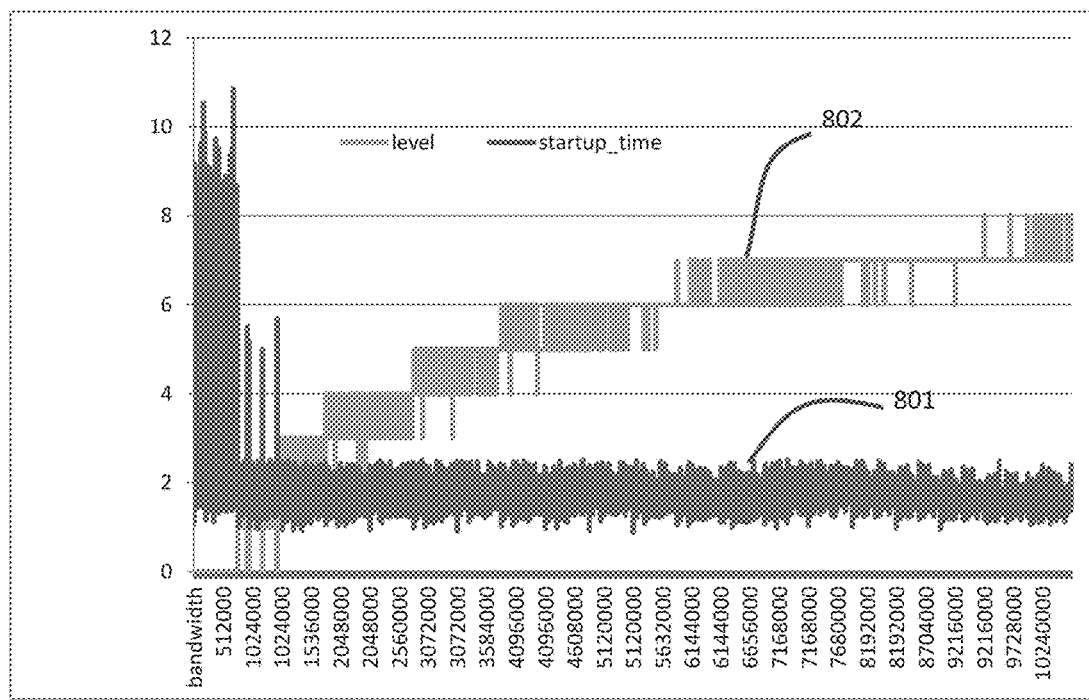
FIG. 8 illustrates a chart showing bandwidth versus average start-up time of playback in accordance with an embodiment of this invention.

FIG. 8 illustrates a chart of playback start-up times for an embodiment in accordance with this invention. In the described embodiment, the adaptive streaming system provides 9 streams. The bandwidth of the communicative connection between the playback device and remote server is varied between 500 Kbps and 10 Mbps. The estimated stability period for the bandwidth is 20 seconds and the system has a constant change in seek times. Line 801 shows the selected streams for the playback. The time of the start-up is shown be line 802. The bandwidth is shown along the x-axis and the time is shown along the y-axis. As can be seen from the chart, the average playback start-up time is approximately 1.8 seconds after a single portion of the encoded media has been downloaded. This represents a significant improvement over the typical 8 seconds for a conventional playback start-up.

The above is description of embodiments of systems and methods in accordance with the present invention. It is foreseen that other skilled in the art will design alternative systems that infringe on this invention as set forth in the following claims either literally or through the Doctrine of Equivalents.

What is claimed is:

1. A method performed by a playback device for selecting one of a plurality of alternative streams for start-up of playback of encoded media from a playback position within the encoded media, wherein each of the plurality of the alternative streams includes the encoded media divided into a plurality of portions and each of the plurality of portions in each of plurality of alternative streams has the same playback duration, the method comprising:

determining an estimated stability period for a current bandwidth of a communicative connection between the playback device and a remote system providing said plurality of alternative streams in response to a playback request using the playback device, where the estimated stability period for the current bandwidth is a time period that the current bandwidth of the communicative connection between the playback device and the remote system is expected to remain stable;

selecting one of the plurality of alternative streams for start-up of playback of encoded media from a playback position within the encoded media, wherein each of the plurality of the alternative streams includes the encoded media divided into a plurality of portions and each of the plurality of portions in each of plurality of alternative streams has the same playback duration;

determining whether each particular one of a predetermined number of the plurality of portions of the encoded media in the selected one of the plurality of alternative streams starting from the playback position can be received from the remote system over the communication network at the current bandwidth prior to a playback time for the particular portion of encoded media during the estimated stability period such that an underflow condition does not occur during playback of the encoded media using the playback device; and commencing streaming of encoded media by requesting the plurality of portions of encoded media be transmitted using the selected one of the plurality of alternative streams from the remote system using the playback device in response to a determination that the predetermined number of the plurality of portions can be received during the estimated stability period.

2. The method of claim 1 wherein the predetermined number of the plurality of portions includes a sufficient number of the plurality of portions of the encoded media to provide a sufficient buffer during playback after the estimated stability has ended.

3. The method of claim 1 wherein the determining whether each particular one of the predetermined number of the plurality of portions of the encoded media from the selected one of the plurality of streams can be provided prior to playback time for the particular one of the predetermined number of the plurality of portions during the estimated stability period such that an underflow condition does not occur during playback of the encoded media comprises:

reading an index of portions of the encoded media for the selected one of the plurality of streams to determine the size of each of the plurality of portions of encoded media starting from the playback position in the selected one of the plurality of alternative streams using the playback device;

determining a download time for each of the plurality of portions in the selected one of the plurality of streams starting from the playback position based on the size of each of the plurality of portions using the playback device;

comparing the download time of each of the plurality of portions starting from the playback position to the playback time of the data in each of the plurality of portions and accumulating the difference to determine whether an underflow condition occurs during the estimated stability period using the playback device; and comparing the download time of each of the plurality of portions to an end time of the estimated stability period to determine whether a predetermined number of the plurality of portions of the selected one of the plurality of alternative streams is received prior to the end of the estimated stability period to provide a sufficient buffer for playback after the estimated stability period has ended using the playback device in response to a determination that the selected one of the plurality of alternative streams does not cause an underflow condition during the estimated stability period.

4. The method of claim 3, wherein the selecting of one of the plurality of alternative streams, comparing of the download time of each of the plurality of portions to the playback time of each of the portions, and comparing of the download time of each of the plurality of portions to the end time of the estimated stability period are repeated for each of the plurality of alternative streams until one of the plurality of alternating streams is determined to be able to provide the predetermined number of the plurality of portions prior to the playback time during the estimated stability period.

5. The method of claim 4 further comprising:
performing an alternative selection process for selecting one of the plurality of alternative streams using the playback device in response to a determination that the predetermined number of the plurality of portions of the encoded media starting from the playback position cannot be provided using any of the plurality of alternative streams prior to playback time during the estimated stability period using the playback device.

6. The method of claim 5, wherein the determining whether the predetermined number of the plurality of portions of the encoded media from the selected one of the plurality of streams can be provided prior to playback time during the estimated stability period such that an underflow condition does not occur during playback of the encoded media further comprises:

discarding a first portion from each of the plurality of portions of each the plurality alternative streams starting from the playback position from consideration in response to a determination that a plurality of portions of the encoded media cannot be provided using any of the plurality of alternative streams prior to playback time during the estimated stability period using the playback device; and repeating the selecting of one of the plurality of alternative streams, the comparing of the download time of each of the plurality of portions to the playback time of each of the portions, and the comparing of the download time of each of the plurality of portions to the end time of the estimated stability period for each of the plurality of alternative streams on the plurality of alternative streams with the first portion of each of the plurality of portions discarded.

7. The method of claim 5, further comprising:
selecting one of plurality of alternative streams from which to obtain the plurality of portions of the encoded media using the playback device in response to a determination that the predetermined number of the plurality of portions of the encoded media starting from the playback position cannot be provided using any of the plurality of alternative streams prior to playback time during the estimated stability period using the playback device; and requiring a predetermined number of the plurality of portions starting from the playback position be received prior to commencing playback of the encoded media in the playback device.

8. The method of claim 3, wherein the selection of one of plurality of alternative streams is based on a maximum bitrate of each of the plurality of alternative streams.

9. The method of claim 3, wherein the determining whether the predetermined number of the plurality of portions of the encoded media from the selected one of the plurality of streams can be provided prior to playback time during the estimated stability period such that an underflow condition does not occur during playback of the encoded media further comprises:

determining whether the index of portions for the selected one of the plurality of alternative streams is stored by said playback device;
requesting the index of portions for the selected one of the plurality of alternative streams from the remote system using the playback device in response to a determination that the index of portions of the selected one of the plurality of alternative streams is not stored by the playback device; and
receiving the index of portions of the selected one of the plurality of alternative streams using the playback device in response to the requesting of the index from the remote system.

10. The method of claim 1, wherein determining the estimated stability period comprises receiving the estimated stability period from the remote system.

11. The method of claim 1, wherein determining the estimated stability period comprises reading a predefined value for the estimated stability period from a memory of the playback device.

12. The method of claim 1, wherein determining the estimated stability period comprises calculating the estimated stability period in the playback device from information about the communicative connection to the remote system stored in a memory of the playback device.

13. A playback device for providing playback of encoded media for a playback position within the encoded media, the device comprising:
a memory;
a processor configured via a client application stored in the memory to:
determine an estimated stability period for a current bandwidth of a communicative connection between the playback device and a remote system where the estimated stability period for the current bandwidth is a time period that the current bandwidth of the communicative connection is expected to remain stable;
select one of the plurality of alternative streams wherein each of the plurality of the alternative streams includes encoded media divided into a plurality of portions having the same playback duration;
determine whether each particular one of a predetermined number of the plurality of portions of the encoded media in the selected one of the plurality of alternative streams starting from the playback position can be received from the remote system over the communication network at the current bandwidth prior to a playback time for the particular portion of encoded media during the estimated stability period such that an underflow condition does not occur during playback of the encoded media using the playback device; and
commence streaming of encoded media by requesting the plurality of portions of encoded media starting from the playback position be transmitted using the selected one of the plurality of alternative streams from the remote system in response to a determination that the predetermined number of the plurality of portions can be received during the estimated stability period.

14. The device of claim 13 wherein the predetermined number of the plurality of portions includes a sufficient number of the plurality of portions of the encoded media starting from the playback position prior to an end of the estimated stability period to provide a sufficient buffer for playback after the estimated stability period has ended.

15. The device of claim 13, wherein the configuring of the processor to determine whether each of the predetermined number of the plurality of portions of the encoded media can be provided prior to a playback time for the particular portion of encoded media during the estimated stability period such that an underflow condition does not occur during playback of the encoded media further comprises the client application configuring the processor to:
read an index of portions of the encoded media for the selected one of the plurality of streams to determine the size of each of the plurality of portions of encoded media starting from the playback position in the selected one of the plurality of alternative streams;
determine a download time for each of the plurality of portions starting from the playback position in the selected one of the plurality of streams based on the size of each of the plurality of portions;
compare the download time of each of the plurality of portions starting from the playback to the playback time of the data in each of the plurality of portions to determine whether an underflow condition occurs during the estimated stability period; and
compare the download time of each of the plurality of portions starting from the playback position to an end time of the estimated stability period to determine whether a predetermined number of the plurality of portions of the selected one of the plurality of alternative streams is received prior to the end of the estimated stability period to provide a sufficient buffer for playback after the estimated stability period has ended in response to a determination that the selected one of the plurality of alternative streams does not cause an underflow condition during the estimated stability period.

16. The device of claim 15, wherein the configuring of the processor via the client application to select of one of the plurality of alternative streams, compare the download time of each of the plurality of portions to the playback time of each of the portions, and compare the download time of each of the plurality of portions to the end time of the estimated stability period are repeated for each of the plurality of alternative streams until one of the plurality of alternating streams is determined to be able to provide the predetermined number of the plurality of portions can be received during the estimated stability.

17. The device of claim 16, wherein the configuring of the processor further comprises configuring the processor to:
perform an alternative process for selecting the one of the plurality of alternating streams in response to the determination that a plurality of portions of the encoded media cannot be provided using any of the plurality of alternative streams prior to playback time during the estimated stability period.

18. The device of claim 17, wherein the configuring of the processor further comprises the client application configuring the processor to:
discard a first portion from each of the plurality of portions of each the plurality alternative streams from consideration in response to a determination that a plurality of portions of the encoded media cannot be provided using any of the plurality of alternative streams prior to playback time during the estimated stability period; and
repeat the selecting of one of the plurality of alternative streams, comparing of the download time of each of the plurality of portions to the playback time of each of the portions, and comparing of the download time of each of the plurality of portions to the end time of the estimated stability period for each of the plurality of alternative streams on the plurality of alternative streams with the first portion of each of the plurality of portions discarded.

19. The device of claim 17, wherein the processor is further configured via the client application to:
   select one of plurality of alternative streams from which to obtain the plurality of portions of the encoded media in response to a determination that the predetermined number of the plurality of portions of the encoded media starting from the playback position cannot be provided using any of the plurality of alternative streams prior to playback time during the estimated stability period using the playback device; and
   require a predetermined number of the plurality of portions be received prior to commencing the playback.

20. The device of claim 15, wherein the selection of one of plurality of alternative streams is based on a maximum bitrate of each of the plurality of alternative streams.

21. The device of claim 15, wherein the configuring of the processor comprises the client application configuring the processor to:
   determine whether the index of portions for the selected one of the plurality of alternative streams is stored by said playback device;
   request the index of portions for the selected one of the plurality of alternative streams from the remote system in response to a determination that the index of portions of the one of the plurality of alternative streams is not stored by the playback device; and
   receive the index of portions of the selected one of the plurality of alternative streams in response to the requesting of the index from the remote system.

22. The device of claim 13, wherein the configuring of the processor via the client application to determine the estimated stability period comprises configuring the processor via the client application to receive the estimated stability period from the remote system.

23. The device of claim 13, wherein the configuring of the processor via the client application to determine of the estimated stability period comprises configuring the processor via the client application to read a predefined value for the estimated stability period from a memory of the playback device.

24. The device of claim 13, wherein the configuring of the processor via the client applications to determine the estimated stability period comprises configuring the processor via the client application to calculate the estimated stability period in the playback device from information about the communicative connection to the remote system stored in a memory the playback device.

25. A non-transitory machine readable device containing processor instructions, where execution of the instructions by a processor causes the processor to perform a process comprising:
   determining an estimated stability period for a current bandwidth of a communicative connection with a remote system, where the estimated stability period for the current bandwidth is a time period that the current bandwidth of the communicative connection is expected to remain stable;
   selecting one of the plurality of alternative streams from which to receive encoded media for start-up of playback of the encoded media from a playback position within the encoded media, wherein each of the plurality of the alternative streams includes encoded media divided into a plurality of portions having the same playback duration;
   determining whether each particular one of a predetermined number of a plurality of portions of the encoded media from the selected one of the plurality of alternative streams starting from the playback position can be received from the remote system over the communication network at the current bandwidth prior to a playback time for the particular portion of encoded media during the estimated stability period such that an underflow condition does not occur during playback of the encoded media; and
   commencing streaming of encoded media by requesting said plurality of portions of encoded media starting from the playback position be transmitted using said selected one of said plurality of streams from said remote server in response to a determination that the predetermined number of the plurality of portions can be received during the estimated stability period.

26. The non-transitory machine readable device of claim 25 wherein the predetermined number includes a sufficient number of the plurality of portions of the encoded media starting from the playback position prior to an end of the estimated stability period to provide a sufficient buffer for playback after the estimated stability period has ended.

\* \* \* \* \*